Aug. 31, 1965  O. J. SWENSON  3,203,143
AUTOMOBILE SHELTER
Filed Aug. 14, 1962  5 Sheets-Sheet 1
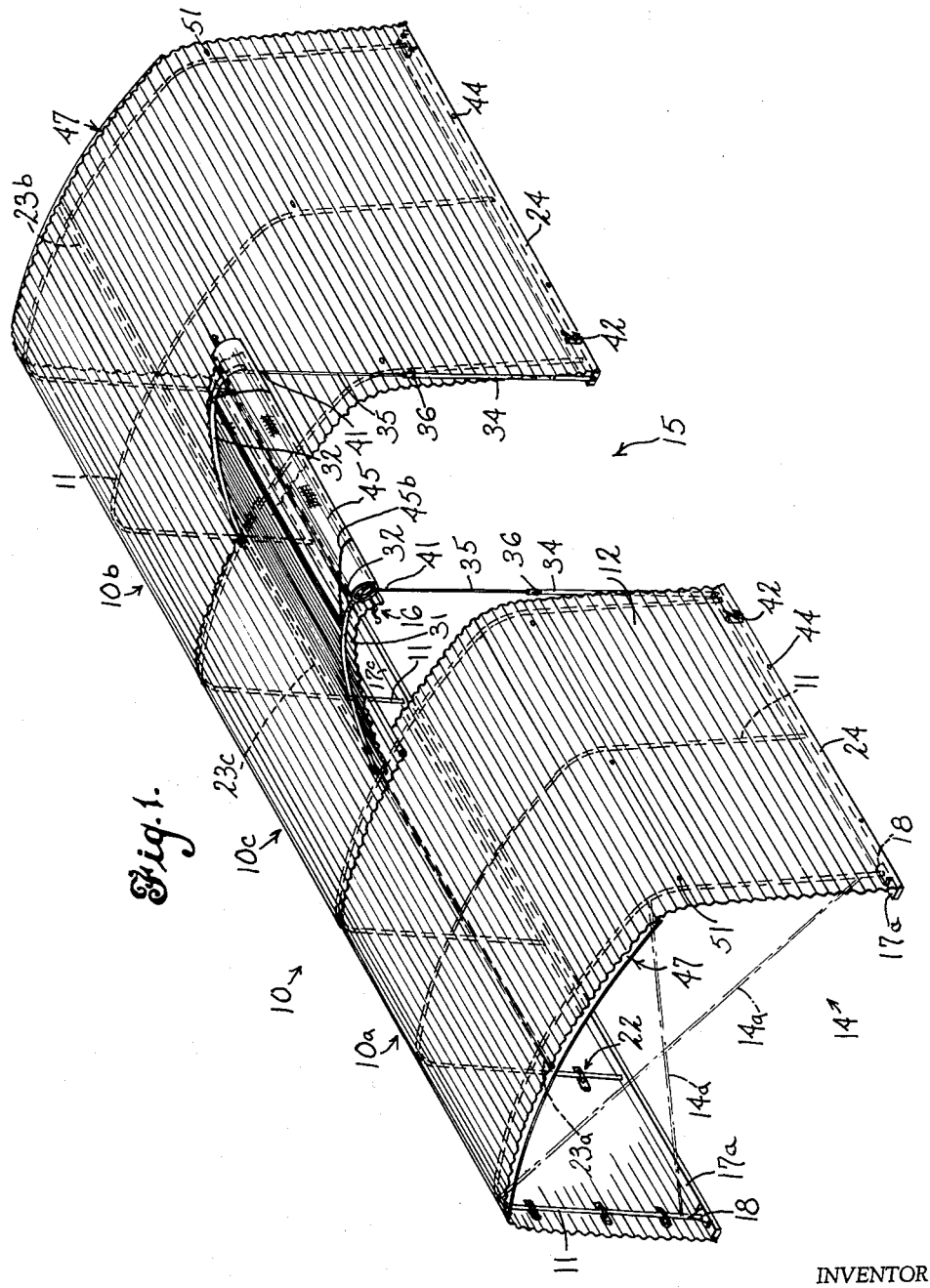
INVENTOR
Oscar J. Swenson
BY Roy L. Parsell
ATTORNEY

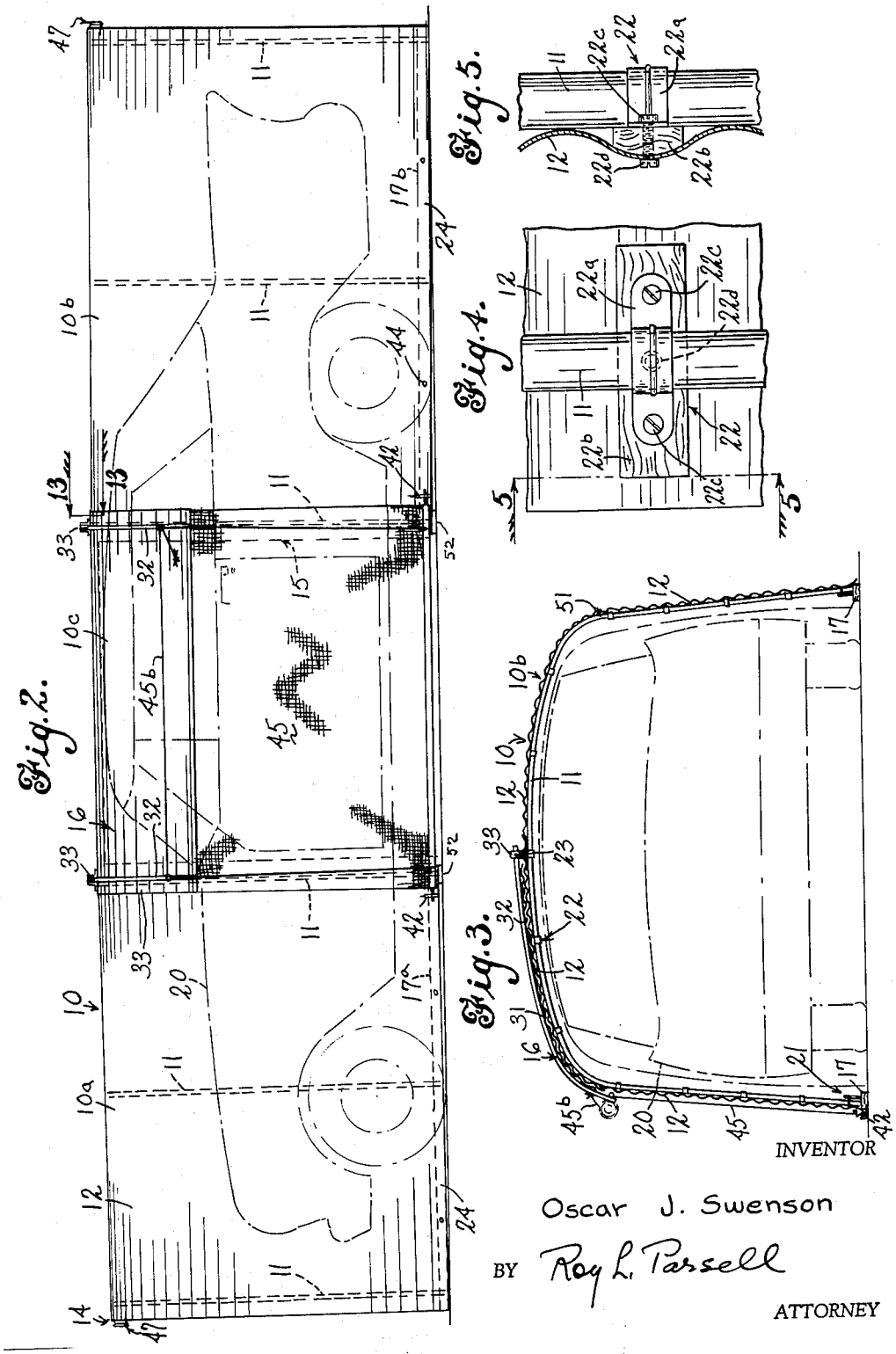

Aug. 31, 1965    O. J. SWENSON    3,203,143
AUTOMOBILE SHELTER
Filed Aug. 14, 1962    5 Sheets-Sheet 3
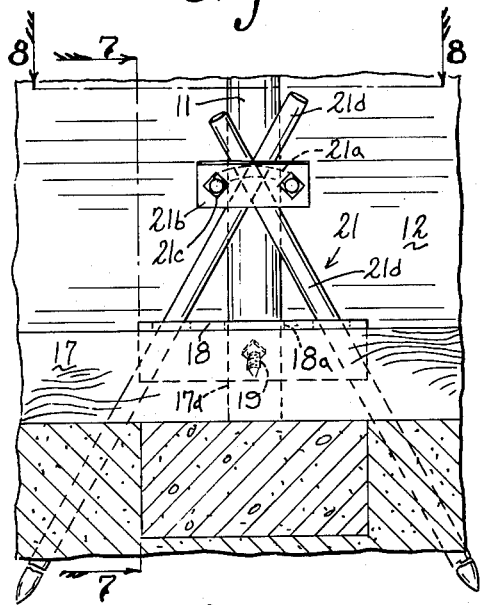
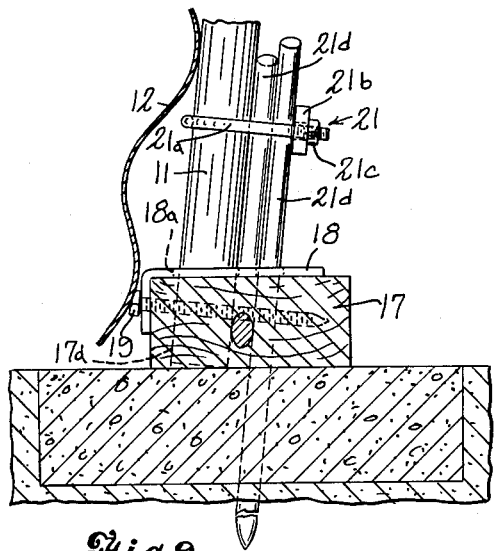
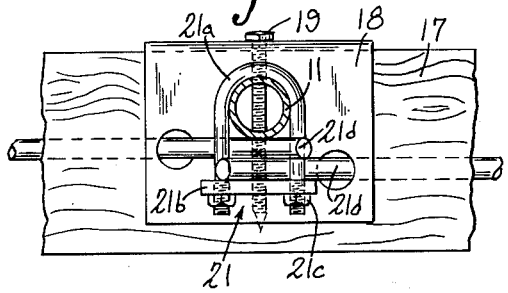
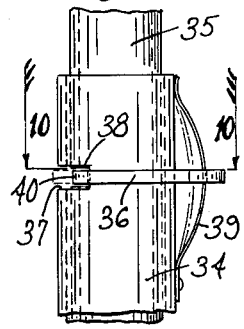
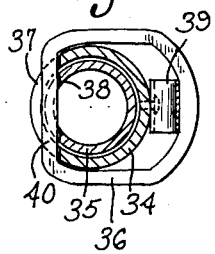
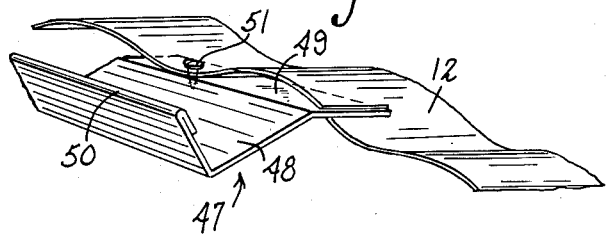
INVENTOR
Oscar J. Swenson
BY Roy L. Parsell
ATTORNEY

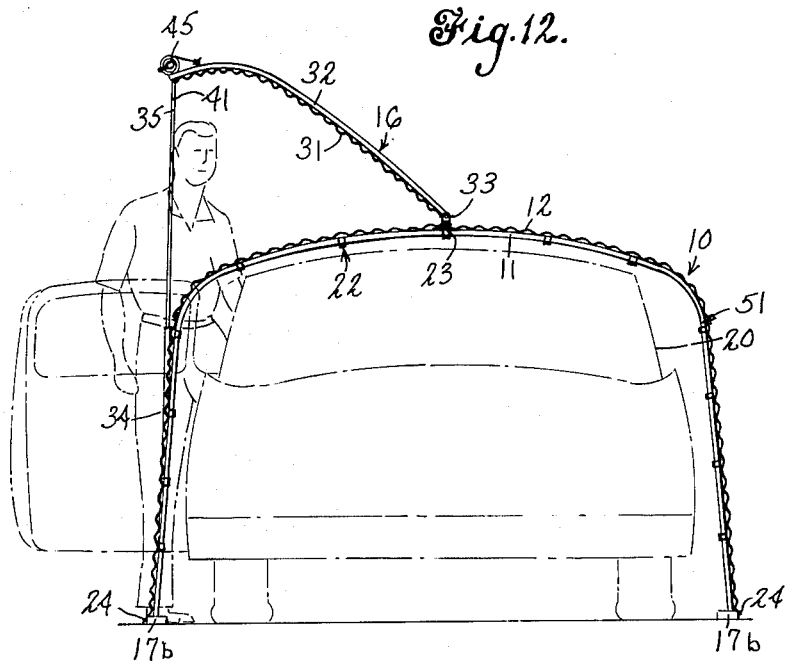
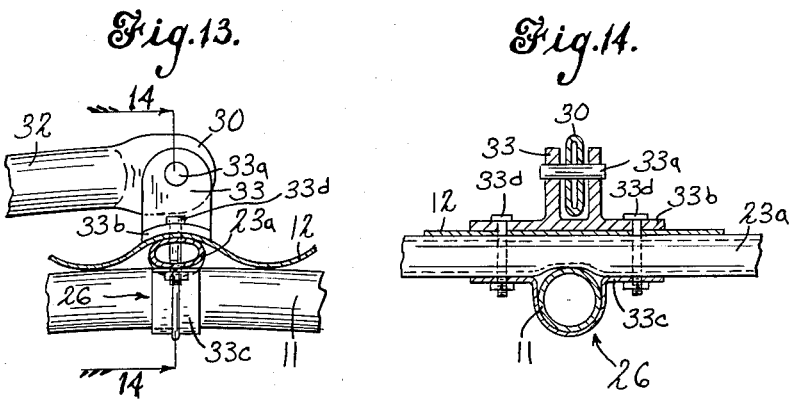

INVENTOR
Oscar J. Swensen
BY Roy L. Parsell
ATTORNEY

3,203,143
AUTOMOBILE SHELTER
Oscar J. Swenson, Killingworth, Conn.
(Branford, Conn.)
Filed Aug. 14, 1962, Ser. No. 216,851
5 Claims. (Cl. 52—64)

This invention relates to a building structure and in particular to a compact shelter for housing an automobile.

Many homes are now without adequate facilities to house the family car or in many cases the second or even the third car. Furthermore there is increasing need for housing cars at places of busines and at parking lots.

The present invention, therefore, is characterized by extraordinary simplicity, mobility and economy of construction to appeal to the car owner for installation and use wherever the car is stationed.

The height of automobiles as presently manufactured is in most cases less than that of the average person. Hence, a distinctive and basically important object of this invention is the convenient access means for the driver to and from a car housed within a shelter of lesser height than the driver.

It is an object of this invention to provide a compact shelter which conforms closely as practical to the maximum cross sectional profile of the car to be housed therein with a practical minimum of top, side and end clearance, thus minimizing required ground area and height as well as saving in construction and labor cost.

Another object of this invention is to provide an automobile shelter construction in convenient sections while maintaining weather tight joints.

Another object is to provide structural elements which can be erected if desired by the car owner.

Another object of this invention is to provide an arrangement of component structural members which can be packaged and conveniently transported to and assembled at desired site.

Yet another object is to provide an attractive and ornamental building.

Still another object is, not only to shelter the car from rain, snow and other types of deleterious substances but also in hot sunny climates to protect the housed car from sun and to assist in maintaining a minimum temperature within the shelter and car consistent with the ambient temperature.

A further object is to provide a structure which can be conveniently taken apart and stored or moved to another location and reassembled.

A still further object of this invention is to provide an automobile shelter construction which can be installed and used either on level or sloping site.

Yet another object is to provide means for disposing of any rain water which might seep through the walls.

Other objects and advantages will become apparent in the following specification when considered in the light of the drawings in which:

FIG. 1 is a perspective view showing one end, top and side of my compact shelter.

FIG. 2 is a side elevation view.

FIG. 3 is an end elevation view.

FIG. 4 shows the clamping means for securing a portion of side wall to a supporting rib.

FIG. 5 is an end view of the structure shown in FIG. 4.

FIG. 6 is a side elevation view showing the means for anchoring the building to the ground.

FIG. 7 is an end view of the construction shown in FIG. 6.

FIG. 8 is a horizontal sectional view taken on line 8—8 of FIG. 7.

FIG. 9 is an elevation of a portion of the hatch cover supporting member showing the latch means.

FIG. 10 is a horizontal section taken on line 10—10 of FIG. 9.

FIG. 11 is a sectional view of the rain gutter.

FIG. 12 shows schematically the means of easy access.

FIG. 13 is a vertical section taken on line 13—13 of FIG. 2 showing the hatch cover hinge somewhat enlarged.

FIG. 14 is a vertical section taken on line 14—14 of FIG. 13.

Figure 15:
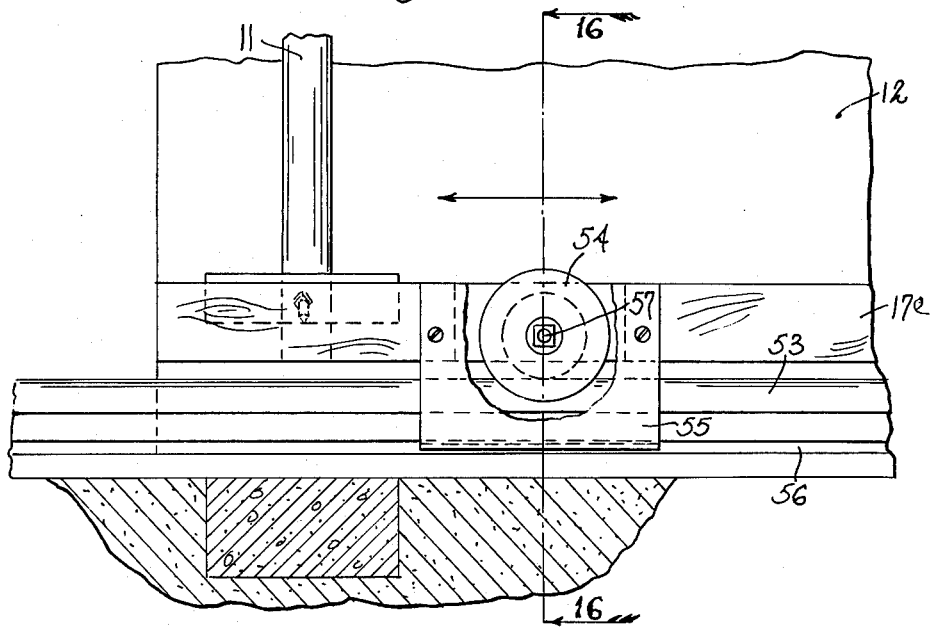
FIG. 15 is an elevation of a portion of another embodiment.

Referring now to the drawings in detail wherein the reference numerals indicate like parts throughout the several figures, the numeral 10 indicates generally the shelter constructed in accordance with the invention.

The shelter 10 comprises in general continuously connected top and side walls 12 supported by ribs 11 fixed to sills 17a and 17b integrated into an arched shaped enclosure, having a uniform cross section throughout its length. The preferred wall 12 material is corrugated sheet aluminum with the corrugations running longitudinally. Other suitaable materials may be used such as iron, steel, wood or synthetic resinous plastic composition.

The enclosure may also be constructed as a frameless monolithic or partly monolithic structure from such materials as reinforced concrete, reinforced plastic, foam plastic, laminated ply wood or combination thereof. I may use a covering of some of the above mentioned materials on a monolithic base.

The preferred construction consists essentially of two similar sections 10a and 10b spaced apart longitudinally and joined together by a third section 10c. The sections 10a and 10b normally slope longitudinally away sufficiently from the center section 10c to carry off any rain water or the like.

In the preferred construction, the transverse supporting ribs 11 are spaced longitudinally at intervals and mounted on sills 17 of wood resting on the ground or other suitable base. The preferred construction comprises one piece tubular metal members 11 bent to conform to the desired cross sectional contour of the shelter to enable minimum practical top and side clearance for a car entering or leaving the shelter.

In forming the ribs of my shelter, I not only have in mind providing minimum practical clearance around the sides and top of the car, but also to provide a shelter having a pleasing outside contour. I accomplish these ends by bending the ribs to form a wide arch with a radius of from 96 to 180 inches and further bending portions on either side thereof with a radius of from 6 to 18 inches. I extend the remaining portions of the ribs downward at a slight variance from the absolute vertical by forming an angle with the horizontal of from 89 to 75 degrees. My shelter is adaptable to the popular sports cars as well as the larger cars such as Cadillac and the like.

The wall 12 material of sections 10a and 10b is secured to the rib members 11 by suitable fasteners or clamping means. In the preferred construction when using corrugated aluminum sheets, special wall clamp means 22 is used. The clamp means 22 comprises a wood filler piece 22b having one side rounded to coincide with the hollow of the aluminum corrugation and extending in each hollow for a suitable distance either side of the rib 11 and normal thereto. A flanged U-shaped member or yoke 22a surrounds the tubular rib 11 and the yoke flanges are secured to the other side of the wood filler 22b by screw 22c. With the filler 22b now secured to the rib 11, the wall 12 may be secured to the wood filler 22b by a screw 22d. With the wood filler 22b resting in the hollow of the corrugation and extending for distances either side of rib 11, stresses which may occur between wall 12 and rib 11 are absorbed directly by filler 22b, thus minimizing any tendency for screw 22d to tear through the wall 12 material.

Angular sill plates 18 (see FIG. 7) are secured to sills 17 by means of lag screws 19 and provided with a hole 18a to receive the lower end of rib 11 which extends therethrough into a hole 17d in sill 17. The lower end of the rib 11 is drilled to receive the lag screw 19. Rib 11 may be secured to sill 17 with only lag screw 19, but use of sill plate 18 in addition is preferred for added strength. Other suitable means of attaching rib 11 to sill 17 may be used if desired.

Suitable anchor means may be provided as needed, as for example, at or near corner ribs. The preferred form 21 comprises a pair of drive rods 21d obliquely driven in the ground through appropriate holes in sill plates 18 and the sills 17a and 17b in a plane substantially parallel to the side wall 12 at the base of rib 11 and crossing each other at a suitable distance above the sills 17a and 17b as clearly shown in FIG. 6. A U-shaped anchor clamp 21a, cross bar 21b and clamp nuts 21c respectively secure drive rods 21d to rib 11 at the crossing point of the drive rods 21d.

In the preferred construction, each section 10a and 10b has a member 23a, 23b and 23c respectively corresponding to a ridge pole which is secured to the top of the ribs 11 by suitable clamping means 26. Corrugated wall 12 material rests on top of ridge pole members 23a, 23b and 23c respectively with the latter nesting in a corrugation hollow. Section 10c is enclosed by wall 12 material on but one side and an adjacent portion of the top leaving an opening which comprises a hatchway 15 for the driver's access as will be subsequently described. Sill 17c is joined to the adjacent ends of sills 17a and 17b respectively by any suitable means omitting however a sill opposite 17c. Side wall 12 material is secured to sills 17a, 17b and 17c respectively by screws or similar means. The respective ends of ridge pole members 23a, 23b and 23c are joined in any suitable manner, as for example, flattening the ends and clamping them in juxtaposition.

This enclosing wall 12 material of section 10c overlaps a short distance on walls 12 of sections 10a and 10b respectively, the corrugations nesting with each other to form a partially water tight joint. However, it is adequately weather tight because the pitching of sections 10a and 10b, as aforesaid, normally carries off the rain water and prevents any water from seeping through the joint. Likewise this pitching prevents the water from running into the hatchway 15.

A feature which has contributed to the success of my shelter in enabling me to use sheet type of wall material without the necessity of hermetically sealing the transverse joints between sheets is the rain gutter 47 which I can attach to the wall 12 sheets when desired. While I overlap my wall sheets, shingle fashion, any water which may seep through the joint due to wind or the like is disposed of by this feature. Referring now to FIG. 11, in making my rain gutter 47 I form a strip of sheet material, preferably aluminum, into a through 48 with an adjacent attaching flange 49 well above the bottom thereof. At the other or free side of the trough, I overlap a portion to present a smooth edge 50.

The rain gutter 47 is then formed along its length to conform to the profile of the roof wall 12 to which it is usually attached at opposite ends of the shelter with sheet metal screws 51 to carry off rain water laterally to each side where it falls freely to the ground or through a leader pipe (not shown). I may also attach the rain gutter 47 to the roof wall 12 around the hatchway 15 and at the joints of sections 10a and 10b with section 10c to collect and drain away any rain water entering the shelter at these points.

Cross tie rods may be used at the end opposite the car entrance end of section 10b, if desired, as clearly shown in FIGS. 1 and 3, comprising in the preferred form tubular metal members secured by suitable clamp means to the end rib. Also, if desired, this end may be closed with canvas, plastic fabric or other appropriate closing means. The opposite or car entrance end may be closed with a roll up curtain or other suitable closure, but in the preferred form I leave the entrance end open.

I achieve my compact shelter with its minimum volume for the car to be housed therein by reducing both the width and height thereof in comparison with conventional garages. The reduction in width is accomplished by providing just enough shelter width to permit the car to move in and out of the enclosure without any aisle or longitudinal path for passage of the driver alongside the car. The reduction in height is accomplished by providing just enough vertical clearance between the top of the car and the top of the shelter to permit the car to enter and leave, emitting provision for the driver to walk erect throughout the shelter. The maximum height of today's cars is 59.3 inches which is less than the maximum of the adult range of 76 inches. Thus a shelter for the low cars in use today could have a height less than that of the average adult driver.

Hence, because of the limitations imposed by the minimum height and width of the shelter as described above, special provision for the access of the driver, which is one of the important objects of my invention, is provided by the hatchway 15 continuously embracing both the side wall 12 and an adjacent portion of top wall 12 and located opposite the car door at the driver's position. This hatchway so located enables the car door to be opened into the hatchway and the driver to pass directly through the open car doorway and through the top and side portions of the hatchway 15 with the same unobstructed freedom of movement as if the car were out in the open and no enclosure existed about the car as shown in FIG. 12.

Hatchway 15 may be enlarged longitudinally or an additional hatchway provided to serve the rear door of the car or hatchways may be provided on the opposite side of the shelter if desired.

To close the hatchway 15, I provide a hatch cover 16, hingeably mounted on the roof wall 12 in the area of the ridge pole as will be described in detail subsequently. The hatch cover 16 is preferably constructed of the same kind of material as the wall 12, i.e. corrugated aluminum with the corrugations aligned so as to nest with the corrugations of the walls 12 when the hatch cover 16 is in closed position. The hatch cover wall 31 is supported by rib members 32 analogous to the ribs 11. In the preferred form, I use a pair of ribs 32 (see FIG. 1), one end of each being flattened to form a hinge tongue 30 (see FIGS. 13 and 14) which cooperate with a pair of lugs 33, integral with a base 33b which is secured through top wall 12 to rib 11 by any suitable means, as for example, bolts. Hinge pin 33a retains hinge tongue 30 in place between lugs 33 to complete the hinge means.

In the preferred form, I mount base 33b on the outside of the corrugated sheet aluminum above the ridge pole 23 and where the ridge pole 23 crosses a rib 11, I prefer to slightly flatten the ridge pole 23 member to more nearly conform to the hollow in the wall 12 corrugations and the contour of the rib 11 and permit it to be joined to ridge pole section 23a as shown clearly in FIGS. 13 and 14. A U-shaped member or yoke 33c similar to clamp 22a is placed about rib 11 and bolts 33d securing base 33b to yoke 33c.

Should it be necessary to locate the hinge base 33b at a spot other than over the ridge pole 23c, a short tubular member (not shown) similar to the ridge pole 23c member is located under the top wall 12 parallel to ridge pole 23c and a fastening means similar to that just described is followed, or alternately I may attach base 33b by means of wall clamp 22.

As shown in FIGS. 1 and 3, the hatch cover wall 31 overlaps the walls 12 around the hatchway to effect a weather tight joint similar to that previously described when the hatch cover 16 is closed.

I provide means for holding the hatch cover 16 in a raised position, when desired, which in the preferred form comprises a pair of telescoping tubes 34 and 35 mounted respectively on each side of hatchway 15. The lower or outside tube 34 is swingingly mounted on sill 17 and extends about half way to the maximum open position. The inside or upper tube 35 telescopes within the lower tube 34 and is swingingly connected to the bottom edge (closed position) of the hatch cover 16. A latch ring 36 located adjacent the top of the outside tube 34 co-operates with slot 37 in the outside tube 34 and slot 38 in the inside tube 35 to hold the upper or inside tube in the desired elevated position. A spring 39 continually presses on the latch portion 40 of latch ring 36 toward the axis of the tubes 34 and 35 so that when the slots 37 and 38 are aligned, the latch portion already reposing in slot 37 of the outside tube 34 slips into slot 38 of the inside tube 35 and holds the latter in elevated position until manually released to lower the hatch cover 16.

A latch slot 41 may be located adjacent the top of the inside tube 35 to cooperate with latch portion 40 to retain the hatch cover 16 in closed position.

In the preferred form, the hatch cover 16 closes only the upper portion of the hatchway 15 and to effect a complete closure of the hatchway 15, I supplement the hatch cover 16 with a roll up curtain 45 of canvas, plastic fabric or the like as shown clearly in FIG. 1 secured to the lower edge (hatch cover lowered) of the hatch cover 16. I also provide a pair of latches 42 on either side of hatchway 15 near its bottom end to hold down the lower edge of the curtain when placed in closed position.

When in raised position, hatch cover 16 serves as an awning or canopy. In mild weather the curtain 45 may be extended horizontally from the hatch cover 16 (raised position) and supported on suitable poles, not shown, or the like.

When the shelter is erected in a hot sunny climate, I prefer to leave both ends open and use bright aluminum for the walls 12 so that the hot sun rays will be reflected and the air circulate through the shelter 10 with the resulting effect of maintaining a temperature inside the shelter which will not be greater than the ambient temperature outside.

My invention also takes into consideration the convenient and economical transportation of the material to the site and the time and labor necessary to erect the shelter.

Thus transportation of all the material may be made in three simple packages of convenient size and weight, the first comprising wall 12 material in flat sheets, ridge poles 23a, 23b, 23c and sill members 17a, 17b, 17c, the latter being used to form part of the shipping crate. A bundle of ribs 11 comprises the second package and the remaining parts and accessories comprising the third package.

The essential steps in the preferred procedure for erecting the shelter delivered to the site in unassembled form is preferably as follows:

Beginning with assembly of an end section 10a, the sills 17a containing the holes 17d to receive the bottom ends of ribs 11 are laid on the ground which in this example is considered to be level. Ribs 11 are placed, each in turn, in an upright position, their bottom ends inserted through holes 18a in sill plates 18 into holes 17d in sills 17a and anchored to sills 17a by lag screws 19. The ridge pole 23a is then secured on top of the ribs 11 by ridge pole clamps 26a at the longitudinal center line of the erected ribs 11. Raising blocks 52 are placed underneath the sills 17a and 17b as shown in FIG. 2 to give sections 10a and 10b their desired slope. Anchor rods 21d may now be driven and secured to the ribs 11 by anchor clamps 21.

A corrugated sheet is now removed from the package and laid with the corrugations running longitudinally on top of one end section of the frame work with the ridge pole 23a nesting in the proper corrugation valley in order to give the desired overlap with the corresponding sheet to be placed on the other side of the ridge pole. The sheet is secured to the ribs as may be necessary at this time by means of wall clamp 22. The advantage of this clamp 22 is now evident as it permits quick and easy assembly for a workman with a hand drill can drill through the wall 12 to contact the filler 22b at any convenient point thereon without the necessity of aligning predrilled holes in the respective members.

A second wall 12 sheet is now secured to the ribs 11 by the same clamp means 22 with the upper edge of the wall 12 sheet tucked under the lower edge of the wall 12 sheet already in place, shingle style, to lead off rain water and the like. Then the bottom wall sheet is placed in position so that a hill of the corrugation at its lower edge is extended over the top outer edge of the sill 17a to constitute a water table and is secured to sill 17a by screws 44, in addition to wall clamps 22 on the ribs 11.

The opposite side of this section 10a is now completed in a like manner overlapping the already in place top sheet by the desired number of corrugations with the hills and valleys registering with each other respectively to comprise a joint. The longitudinal edges of adjoining sheets are secured to each other by longitudinally spaced sheet metal screws.

The completed assembly of wall 12 sheets to ribs 11 by means of wall clamps 22 together with the securing of the bottoms of the wall 12 sheets to sills 17a and ribs 11 to sills 17a achieves maximum rigidity in all directions, not only from the beam strength of ribs 11 and sills 17a but also from skin strength of the wall 12 material.

Next, the opposite end section 10b is assembled in a like manner and then the center section 10c. Since the site, in this example, is a level one, the wall 12 sheets of this section 10c overlap on top of those of the respective end sections 10a and 10b which are pitched slightly toward the respective opposite ends for water run off as aforesaid.

Rain gutter 47 may be attached to top wall 12 at the open and lower ends of sections 10a and 10b respectively to collect and drain off rain water or the like. No gutters 47 are required at the sides of the hatchway 15 when the shelter 10 is on a level site because of the respective pitches of sections 10a and 10b. However, should the shelter 10 be located on a longitudinal slope then a rain gutter 47 would be installed on wall 12 at that edge of the hatchway having the respective higher elevation. If conditions warranted a gutter 47 could be installed at the hatchway 15 as just described and continued across the shelter along the edge of the adjacent highest end section to collect and carry away any water which might seep through the joints along this line.

The hatch cover 16 is next assembled by securing the corrugated sheet forming the hatch cover wall 31 to the hatch cover rib 32 by screws. The hinge base 33b is secured to the wall 12 preferably over a rib 11 and the companion hinge tongue 30 of the assembled hatch cover 16 pinned to the hinge lugs 33.

The manner in which my novel shelter is used in housing a car is now described.

Assume that the cycle starts with the car already housed in the shelter 10 with the hatch cover 16 in its lowered or closed position and the roll up curtain 45 closed down with its lower edges fastened by its latches 42.

The driver unlatches the curtain 45 and rolls it up by pulling on cords 45b. Next, he raises the latch cover 16 with its curtain 45 rolled up and fastened until the hatch cover 16 is locked open by the functioning of latch ring 40.

The driver can now open wide the car door through the open hatchway 15 and enter his car freely and without being obliged to stoop or squeeze due to interference of top wall 12 or side wall 12.

The car is then backed out, or in cases where the front end cross bracing is not used, may be driven out forwardly. Hatch cover 16 and roll curtain 45 may be left open until the car returns to reenter the shelter 10, or the hatch cover 16 alone or the hatch cover 16 and curtain 45 may be restored to closed position.

In returning to again house the car, the driver, after making sure that both hatch cover 16 and roll curtain 45 are in hatchway open position, drives the car into the shelter 10 through the car entrance end, stopping the car so that the car door he uses is opposite the hatchway 15. The driver then opens the car door which swings through the hatchway 15 and steps out of the car just as if the car were out in the open, passing through the hatchway 15 freely and erectly, since the hatchway is located in both the side wall and the top wall.

The hatch cover 16 may be then lowered by releasing the latches and if desired the roll curtain 45 lowered and secured at the bottom by means of hold down latches 42.

The cycle is thus completed.

Figure 16:
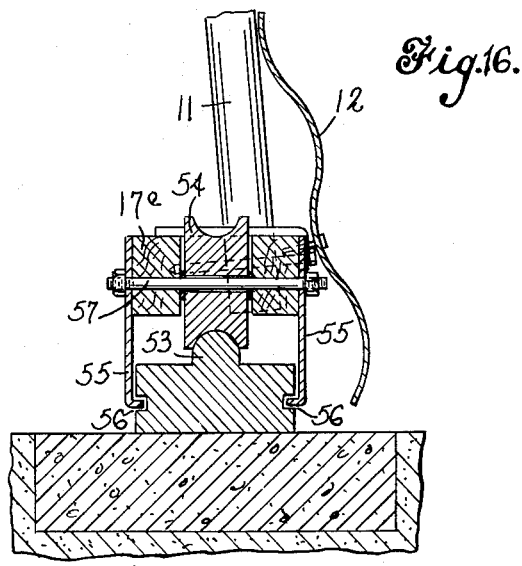
FIG. 16 is a vertical section taken on line 16—16 of FIG. 15.

The construction described above for sections 10a and 10b of my shelter enables a further embodiment of my invention in providing for access into and from the shelter. In this embodiment, two structural sections such as 10a and 10b of a total combined length adequate to house a car therein are assembled in the manner described above with the addition of rail members 53, rollers 54, and slide members 55 as shown in FIGS. 15 and 16. Rail members 53 are anchored to the ground or other suitable base in any suitable manner similar to that used for the sills 17a and 17b as previously described. Rollers 54, rotatively attached to the new sill 17e (FIGS. 15 and 16), with axle pins 57, rest on rails 53 so as to enable longitudinal movement of either section 10a or 10b, or both, as separate integral units, to open a space therebetween to create a hatchway, similar to that previously described, to provide for access into and from the shelter, or to close this hatchway by longitudinal movement in the opposite direction. Slide members 55 attached to the new sill 17e operate freely in the longitudinal slots 56 of the rails 53 to maintain transverse and vertical relationship between sill 17e and rail 53 while the sections are at rest or are being longitudinally displaced. To collect rain water which may drain into the shelter at the junction of the roof walls 12 of sections 10a and 10b of this embodiment, a rain gutter 47 is attached under the roof wall of one of the sections, as previously described, at the junction end so as to collect and carry away rain water drainage from the roof of this section, and so as to extend a short distance underneath the roof at the end of the adjoining section to collect and carry away any rain water draining therefrom.

A still further embodiment of my invention, based on a modification of the rolling section principle described above, consists of a single section, such as either 10a or 10b, of adequate length to house a car therein, mounted on rollers and rails as described above so as to enable moving the entire housing structure longitudinally as an integral unit through a sufficient distance to cover a car, or to uncover it sufficiently to permit access to and from the car.

Means may also be provided to guide the driver in entering the shelter 10 by various methods. I prefer to use, when so desired, longitudinal lines of strings or ribbons hung from the top wall 12 to just touch and align one edge or body contour of the car as it progresses into the shelter 10.

Means may also be provided to arrest the car at the proper distance from the entrance to align the car door with the hatchway 15, as for example, blocks to engage front wheels.

Successive sections may be added to the existing shelter to take additional cars in tandem. Should it be desired to house cars side by side, walls may be arched with minimum clearances provided as herein described.

Although I have described my invention with a certain degree of particularity, it is understood that the present disclosure has been made only by way of example and that numerous changes in the details of construction or use and the combination and arrangement of parts may be resorted to without departing from the spirit and scope of the invention as hereinafter claimed.

What is claimed is:

1. An elongated tunnel-like shelter for compactly housing an automobile and providing improved access to such automobile for a person whose height is greater than the height of such shelter, said shelter comprising oppositely spaced, elongated, upright side walls, a roof wall, said roof wall spanning said side walls and defining thereabove a continuation thereof, said roof wall and said side walls defining a trasverse cross-sectional profile of said shelter of such internal dimensions as will permit such automobile to pass therethrough with only slight clearance from each of the walls, said walls comprising partially rigid panels, means interconnecting said panels into a rigid unitary structure conforming to said profile and defining a continuous self-supporting wall structure having an end terminal opening for access of the automobile into the shelter, one of said side walls having an access passageway extending therethrough and continuing through an adjacent portion of said roof wall and defining a free opening so as to permit normal free access into such housed automobile simultaneously through said passageway and doorway of the automobile from a position extending into a level above said roof wall, said passageway spaced from the ends of said shelter with portions of said side wall and roof wall extending on each side of said passageway.

2. An elongated tunnel-like shelter for compactly housing an automobile and providing improved access to such automobile for a person whose height is greater than the height of such shelter, said shelter comprising oppositely spaced elongated upright side walls, a roof wall, said roof wall spanning said side walls and defining thereabove a continuation thereof, a plurality of transversely disposed ribs spaced from each other along the longitudinal axis of said shelter for supporting said walls, each of said ribs defining a transverse cross-sectional profile of said shelter of such internal dimensions as will permit such automobile to pass therethrough with only slight clearance from each of the walls, said walls comprising partially rigid sheets embracing a plurality of said ribs, means fixedly securing said sheets to said ribs to form a rigid unitary structure, said sheets manually bendable about axes thereof longitudinal of said shelter to conform to said profile when secured in position on said ribs by said securing means but sufficiently rigid about axes thereof transverse of said shelter when so secured to define a continuous self-supporting wall structure having an end terminal opening for access of the automobile into the shelter, one of said side walls having an access passageway extending therethrough and continuing through an adjacent portion of said roof wall and defining a free opening so as to permit normal free access into such housed automobile simultaneously through said passageway and doorway of the automobile from a position extending into a level above said roof wall, said passageway spaced from the ends of said shelter with portions of said side wall and roof wall extending on each side of said passageway.

3. An elongated tunnel-like shelter for compactly housing an automobile and providing improved access to such automobile for a person whose height is greater than the height of such shelter, said shelter comprising oppositely spaced elongated upright side walls, a roof wall, said roof wall spanning said side walls and defining thereabove a continuation thereof, a plurality of transversely disposed ribs spaced from each other along the longitudinal axis of said shelter for supporting said walls, each of said ribs defining a transverse cross-sectional profile of said shelter of such internal dimensions as will permit such automobile to pass therethrough with only slight clearance from each of the walls, said walls comprising sheets embracing a plurality of said ribs, means fixedly securing said sheets to said ribs to form a rigid unitary structure, said sheets having corrugations comprising crests and valleys extending longitudinally of said shelter, said sheets manually bendable about axes thereof longitudinal of said shelter to conform to said profile when secured in position on said ribs by said securing means but sufficiently rigid about axes thereof transverse of said shelter when so secured and because of said corrugations to define a continuous self-supporting wall structure having an end terminal opening for access of the automobile into the shelter, one of said side walls having an access passageway extending therethrough and continuing through an adjacent portion of said roof wall and defining a free opening so as to permit normal free access into such housed automobile simultaneously through said passageway and doorway of the automobile from a position extending into a level above said roof wall, said passageway spaced from the ends of said shelter with portions of said side wall and roof wall extending on each side of said passageway.

4. In the shelter of claim 3, said means for fixedly securing said sheets to said ribs comprising an anchorage member having an area of fitted engagement with said sheet, said area being greater than the cross-sectional area of said rib projected on said anchorage member, means for fixedly securing said sheet and said anchorage member together and means for securing said anchorage member to said rib.

5. In the shelter of claim 3, means for closing said passageway comprising a passageway closure member defining a portion of said roof wall when closing at least the upper portion of said passageway, such portion of said closure member movable as required to free said passageway for such normal free access.

References Cited by the Examiner
UNITED STATES PATENTS

| | | | |
|---|---|---|---|
| 715,185 | 12/02 | Warner | 50—51 |
| 1,182,082 | 5/16 | Fouts | 189—2 |
| 1,229,477 | 6/17 | Kramer | 189—2 |
| 2,717,060 | 9/55 | Collins. | |
| 2,812,730 | 11/57 | Hermann. | |
| 2,833,228 | 5/58 | Martin. | |
| 2,856,941 | 10/58 | O'Neal | 135—1 |
| 3,028,872 | 4/62 | Cresswell. | |
| 3,103,706 | 9/63 | Dyck | 20—1.13 |

FOREIGN PATENTS

| | | |
|---|---|---|
| 134,281 | 9/49 | Australia. |
| 129,116 | 7/32 | Austria. |
| 66,821 | 3/48 | Denmark. |
| 323,096 | 12/29 | Great Britain. |
| 667,735 | 3/52 | Great Britain. |
| 823,637 | 11/59 | Great Britain. |
| 277,562 | 12/51 | Switzerland. |

OTHER REFERENCES

Enginering News-Record, pages 98, 99 and 100, Oct. 21, 1943.

EARL J. WITMER, *Primary Examiner.*